US006728204B1

(12) United States Patent
Helander et al.

(10) Patent No.: US 6,728,204 B1
(45) Date of Patent: Apr. 27, 2004

(54) ARRANGEMENT, SYSTEM AND METHOD RELATING TO DATA/TELECOMMUNICATION

(75) Inventors: Lars-Erik Helander, Träslövsläge (SE); Sten Pettersson, Säve (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/324,895

(22) Filed: Jun. 3, 1999

(30) Foreign Application Priority Data

Jun. 3, 1998 (SE) ............................................... 9801959

(51) Int. Cl.⁷ ............................................. H04L 12/56
(52) U.S. Cl. ........................................ 370/216; 370/242
(58) Field of Search .................................. 370/216, 242, 370/254, 241, 394, 389

(56) References Cited

U.S. PATENT DOCUMENTS

| 5,732,086 A | * | 3/1998 | Liang et al. ................. 370/410 |
| 5,815,668 A | * | 9/1998 | Hashimoto ............. 395/200.68 |
| 6,041,049 A | * | 3/2000 | Brady ......................... 370/351 |

* cited by examiner

*Primary Examiner*—Kenneth Vanderpuye

(57) ABSTRACT

An arrangement, a system and a method distribute messages in a communication system supporting communication of packet data. The arrangement includes a number of processors communicating with each other. Each processor is connected to all other processors via at least two physically separate networks. For each processor, information holding devices are provided for keeping information about all communication paths to all other processors. For obtaining information, first messages are sent from each processor to all other processors using all of the at least two networks.

37 Claims, 8 Drawing Sheets

ARRANGEMENT, SYSTEM AND METHOD RELATING TO DATA/TELECOMMUNICATION

BACKGROUND

The present invention relates to a distributing arrangement for distribution of messages in a communication system supporting communication of packet data. The invention also relates to a communication system including a number of distributing nodes each of which includes a number of processing means. The invention also relates to a method of fault tolerant communication of messages in a communication system supporting communication of packet data. Particularly the invention relates to an arrangement and a system respectively for fault tolerant communication of messages.

In data/telecommunication systems messages are sent between different processing means. It has become common to implement LAN (Local Area Network) technology within data- and telecommunication equipment. Two reasons therefore are that the LAN technology has become attractive since it is cost effective and that the LAN technology furthermore provides a good performance. However, to provide a satisfactory operation of the systems, the communication needs to be as fault tolerant as possible to introduce reliability, redundancy and freedom from single point failures. A single LAN segment is not sufficiently reliable since the central equipment is not redundantly implemented. In known systems so called FDDI/DAS (Fiber Distributed Data Interface/Dual Attach Station) solutions or alternatively high availability ATM (Asynchronous Transfer Mode) solutions are therefore used.

Both FDDI/DAS and ATM solutions are however expensive.

An implementation of a FDDI/DAS ring is for example known. In that case redundancy is provided for through connecting each processing means to the dual ring and the handling of faults is taken care of in the points of connection.

FDDI/DAS technology is expensive and furthermore it is limited to 100 Mbps making topology restraints on nodes which require a higher bandwidth necessary. Thus, in that case the costs are still further increased since more network interfaces are needed. Furthermore the degree of freedom in software configuration is somewhat limited.

Alternatively a high availability ATM (Asynchronous Transfer Mode) switch with built-in reducancy may be used. Such a solution is however even more expensive than the FDDI/DAS solution. In some technologies the fault tolerancy is handled by protocols on a high level or on the routing level. Furthermore, through the implementation of bridges between the different networks or network segments, fault tolerant communication is not provided everywhere and the communication with some processing means may be lost if a bridge is broken.

SUMMARY

What is needed is therefore an arrangement through which fault tolerant communication can be offered in a data/telecommunication system supporting communication of packet data. Still further an arrangement is needed through which fault tolerant communication can be provided and through which the amount of messages sent within the network, i.e. the network overhead produced hereby, can be kept low. Particularly an arrangement is needed through which it is possible to detect errors in equipment as well as on communication paths and through which it is possible to detect when a communication path etc. functions satisfactorily again and through which messages can be sent from one processing means to another with a high degree of availability, i.e. with a high probability of success. Still further an arrangement is needed through which faults can be detected in a fast and efficient manner thus enabling restoration of errors.

Particularly an arrangement is needed through which the provision of fault tolerance is transparent for high level protocols and on the routing level. Still further an arrangement is needed which allows the use of standard components (hardware). Particularly an arrangement is needed which is cheap and which has a high performance and which is reliable, shows a high degree of redundancy and which provides freedom from single point failures. Still further an arrangement is needed which enables an automatic error detection and failover as well as automatic recovery. Particularly an arrangement is needed which enables operator notification of failures particularly while the operation still is substantially unaffected.

Particularly a distributing arrangement for distribution of messages in a communication system is needed which meets the above mentioned requirements. Still further a communication system supporting communication of packet data is needed through which the above mentioned objects are achieved.

Further yet a method providing fault tolerant communication in a communication system supporting communication of packet data is needed through which the above mentioned objects are achieved.

Therefore a distributing arrangement for distribution of messages in a communication system is provided which comprises a number of processing means which communicate with each other through sending of messages. Each processing means is connected to all the other processing means via at least two communication networks or network segments which are physically separated from each other. For each processing means information holding means are provided for keeping information about all communication paths to all other processing means and this information is obtainable by way of sending first messages, particularly with a given frequency, from each processing means to all the other processing means using all of said at least two communication networks. Such first messages may be sent separately but they may also be piggy-backed on e.g. ordinary traffic messages, or a combination of both. Advantage may also be taken of information indirectly obtainable through the ordinary traffic that flows.

In an exemplary embodiment a predetermined time interval is given for each processing means and first information messages sent from one processing means substantially simultaneously to another processing means using at least two physically separated communication paths including different networks should arrive within the predetermined time interval. If they do so, the at least two different communication paths using different communication networks both function. In an advantageous embodiment the first information messages are special purpose broadcast messages and preferably each processing means send their respective special purpose broadcast messages on all networks or network segments substantially simultaneously. Alternatively the first messages consist of a burst of unicast messages. Particularly each processing means comprises means for detecting anomalies or asymmetries in the reception of such first messages from one and the same sending processing means and when such an asymmetry or anomaly is detected, the receiving processing means enters a decision process to localize the error and or to establish the kind of the error. In a particular embodiment means are provided for comparing the reception of first messages during a first time interval and the reception of first messages during a subsequent observation time intervals. If an anomaly or an asymmetry in the reception during the first observation time interval still remains in the subsequent observation time interval, the receiving processing means sends a second message, e.g. a unicast message containing information about an error or about the result of the sending of the first messages, to the sending processing means on all communication networks/network segments. In an alternative embodiment a second message, e.g. a unicast message, is sent to the sending processing means on all networks/network segments as soon as an error is detected. Still further, more than two observation periods during which one and the same anomaly remains could be the requirement for sending out a second, e.g. a unicast message containing an error announcement. With an asymmetry or anomaly is meant that not all first messages from one and the same sending processing means arrive within the time window of the receiving processing means. It is supposed that each processing means knows which first messages that should be received. Actually it is sufficient to know the number of networks.

For each processing means there may of course be several parallell fault detection processes run at the same time towards different other processing means due to working within the time window and since all processing means communicate with all other processing means.

Particularly, if no messages at all are received in a receiving processing means over one of the networks, said processing means provides for transmission of a broadcast message which is broadcasted to all other processing means using said at least two networks (all available networks) to inform said other processing means that no messages whatsoever are received on that particular network.

In a particular embodiment each processing means comprises means for generation of an alarm message if an anomaly or an asymmetry remains for a given number of observation time periods, which alarm message then is sent to an operation system managing the distributing arrangement using all (available) of said at least two networks.

Instead of using a time window to detect anomalies the messages can be numbered in an appropriate manner, e.g. in sequence, and then can be detected when a message numbered in a particular way is only received e.g. over one network or if it is completely missing etc. since a packet numbered in the same way should be received on all interfaces.

Particularly, in each processing means a table is dynamically built using received unicast messages and possibly information in received broadcast messages (if the network (s) support(s) a broadcasting functionality), which information is used to control the sending of messages from the respective processing means. In a particular embodiment each processing means keeps information about the existence of all other processing means. Particularly said tables contain information about all usable communication paths to all peers, i.e. all other processing means, with which the respective processing means communicate.

In an alternative embodiment each processing means comprises means for sending response messages with information about received first messages, e.g. special purpose broadcast messages, at least to the respective sending processing means. Particularly the information about received first messages is provided in unicast special purpose messages which are sent to the respective sending processing means and they include information about on which network (s) first message(s) is/are received. Said response unicast special purpose messages are sent on all (available) of said at least two networks substantially simultaneously. In a particular embodiment said response messages are used to dynamically build a table in information holding means provided for each processing means which information is used to control the sending of messages from the respective processing means. Particularly said table shows all usable communication paths to all peers, i.e. all processing means, with which a respective processing means communicate.

In particular embodiments an intermediate message handling device is connected to each processing means (or some of the processing means) respectively for handling the sending of said first messages and second messages. In the embodiment implementing sending of response messages, said intermediate devices handle the first messages and response messages.

In a particular embodiment an intermediate message handling arrangement is provided containing all (or a number of) the intermediate message handling devices. In an alternative embodiment means are provided in each (or some of the) processing means for handling the generation/sending/receiving of first and second messages or first messages and response messages.

In a particular implementation the information provided in the information holding means is also used for controlling the sending of messages so as to share the load between the communication paths in an appropriate manner.

In one embodiment the at least two networks comprise separate networks such as different local area networks or networks based on different technologies. There may be more than two networks. Of course also networks based on one and the same technology may be used. In a particular advantageous embodiment the networks support a broadcasting functionality. Alternatively some network(s) support (s) a broadcasting functionality whereas one or more other network(s) do not.

Therefore also a communication system supporting packet data communication is provided which includes a number of distributing nodes for distribution of messages. Each node comprises a number of processing means communicating with each other. All processing means communicate via at least two different networks or network segments which networks/network segments are physically separated. Each processing means comprises or is associated with means for sending first information messages to all other processing means which messages are sent on each of said at least two networks. For each proccessing means information holding means are provided in which the information resulting from the sending of said first information messages is collected to provide information about the available communication paths to all other processing means respectively.

Examples on nodes in which the inventive concept can be implemented are the SGSN (Serving GPRS Support Node) and the GGSN (Gateway GPRS Support Node) wherein GPRS (General Packet Radio Service) is the packet data service of GSM, c.f. e.g. GSM 03.60 V5, 2.0, 1997-12 and the P-MSC of PPDC which is the packet data service of PDC (Pacific Digital Communications).

In a particularly advantageous embodiment the first information messages consist of special purpose broadcast messages and in each processing means detecting means are provided for detecting if first information messages sent from particular sending processing means using the at least two separate networks arrive within a predetermined time interval as well as means of sending a special purpose unicast message to a sending processing means in case messages are not received on all networks within the predetermined time interval for a given number of observation time intervals, to indicate the result or that one of the communication paths contains an error. Particularly, if a processing means does not receive any message on a particular network at all, information thereon is provided in its own next first information broadcast message which is provided to all other processing means using all available networks.

Alternatively the first messages are a burst of unicast messages, e.g. in case a network does not support broadcasting. In an alternative embodiment each processing means comprises means for sending response messages to sending processing means upon reception of first information messages from said sending processing means. Particularly said response messages comprise unicast response messages including information about over which network (s) first information messages is/are received. Particularly each processing means comprises or is connected to information holding means in which a table is built using the information received in second information messages (unicast special purpose messages) or response messages so as to dynamically provide for updated information about available communication paths to all other processing means.

In a particular embodiment message handling means (intermediate devices) responsible for the sending/receiving of first messages and second messages or response messages are provided in connection to one or more (or all) processing means and form an intermediate arrangement comprising one intermediate device connected to each processing means. In an alternative embodiment the message handling means for handling the sending/receiving and generation of first messages and second messages or response message are comprised in the respective processing means.

The at least two networks may be networks of the same kind, or of different kinds and there may be two, three or more different networks. Examples on networks are LAN (Local Area Network), Ethernet, FDDI and ATM. Advantageously the networks support broadcasting functionality.

Therefore also method of providing fault tolerant communication in a communication system supporting communication of packet data and comprising a number of distributing nodes, each of which comprises a number of processing means, is provided. The method comprises the steps of; interconnecting each processing means with all other processing means via at least two physically separated networks; sending first information messages from each processing means to all the other processing means with a given frequency (at least if needed; information obtainable through ordinary traffic may also be taken advantage of) using all of said at least two networks; providing information to at least the sending processing means about faults concerning first information messages sent from the respective sending processing means to the respective receiving processing means on the at least two networks substantially simultaneously; collecting information obtainable through the sending of said first messages for each of said processing means in information holding means using said information to detect errors in the communication paths; and using the information to control the communication between the respective processing means and to keep information about errors.

In a preferred implementation the first information messages comprise special purpose broadcast messages and the method further includes the steps of, when detecting an error, sending a second message comprising a special purpose unicast message to the sending processing means using all of said at least two networks. Alternatively the first messages are a burst of unicast messages.

Particularly the method comprises the steps of defining a time window for each processing means and if all first information messages from one and the same sending processing means using different networks do not arrive in a receiving processing means within the time window; informing the sending processing means. In a particular embodiment the method comprises the steps of, if an error is detected in the communication path when a particular network is used for sending of a message from a particular sending processing means, sending a unicast message to the sending processing means and if it is detected that there is a malfunctioning in the receiving processing means or an error on one of the networks, including information about that in the next first message, e.g. special purpose broadcast message of the receiving processing means which then is broadcasted using all the networks. In an alternative embodiment the method comprises the step of confirming reception of first messages in response, e.g. unicast messages sent to the respective sending processing means, using each network, to provide information about usable communication paths on every network and building a table with information about available communication paths using said response messages in each processing means.

According to different embodiments, as referred to above, the second messages or the response messages resulting from the sending of first messages are used to dynamically build an information table in the respective processing means. It is an advantage of the invention that a high availability on system level provided and that fault tolerant communication is provided in a way that is transparent to the users of the data link services. It is also an advantage that no single point of failures are provided and also that automatic error detection is provided for and that an automatic recovery is enabled. It is also an advantage that it is possible to handle dual unit transmitter/receiver errors even if they are located on separate networks as long as there exists at least one usable transmission path in each direction. According to the invention it is particularly possible to remove one whole network, e.g. a whole local area network, such as for example a switch, in operation without requiring any particular actions by the operator.

BRIEF DESCRIPTION OF THE DRAWINGS

The invention will in the following be further described in a non-limiting way and with reference to the accompanying drawings in which.

DETAILED DESCRIPTION

According to the invention multiple networks, e.g. multiple local area networks, LANs, are introduced in data/telecom equipment and all units, e.g. processing means, are connected to all networks or all LAN segments and advantageously a scheme of special purpose broadcast messages and unicast messages are used to, in each unit or processing means, provide temporary information about all usable communication paths (or about all non-usable) communication paths. It is crucial for the functioning of the intention that the multiple networks (or particularly the multiple of LANS) are completely isolated from each other, meaning that there is no physical connection between them. Consequently devices bridging the networks together are not allowed. In each unit, or each processing means, a table is built which gives up-to-date information, directly or indirectly, on all usable communication paths to all other units or processing means on the networks; the networks will in the following be denoted LANs. In general terms this is provided for through all units or processing means on the LANs making themselves known to all other units or processing means on all the LANs through transmission of first information messages, particularly special purpose broadcast messages. The information in these broadcast messages is used and advantageously second messages are sent back to the respective sending processing means when an error is detected somewhere. Particularly the second messages are so called special purpose unicast messages which thus are directed to the particular sending processing means (or unit). The first mesages may also comprise a burst of unicast messages, e.g. in case a network does not support the broadcasting functionality. It is unique that this can be done transparently to the users of the LAN services still requiring a very low network overhead. The transparency is partcularly achieved either through the use of an intermediate arrangement which is arranged between the peers, i.e. end points of communicating processing means, and the composite networks, particularly LANs, in which the task of maintaning the table of usable communication paths is actually performed. Alternatively the functionality of sending the required messages and building up the table can be provided in a special piece of software. It should be clear that a number of implementations are possible of which some will be illustrated with reference to the accompanying figures.

Figure 1A:
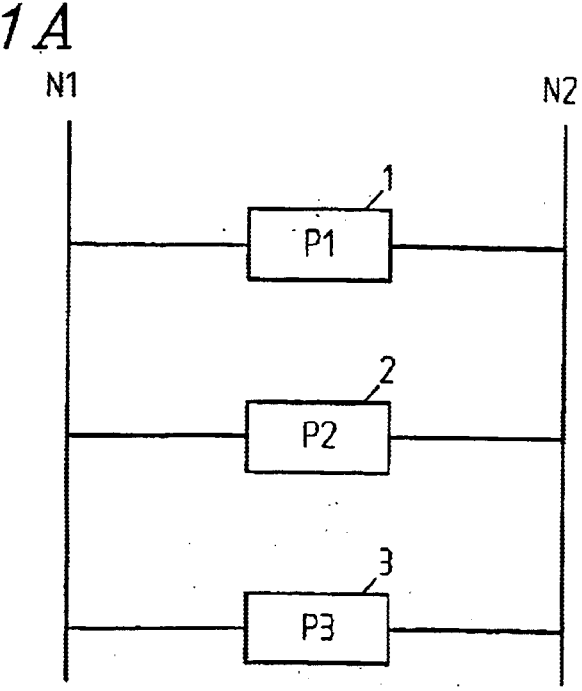
FIG. 1A schematically illustrates a number of processing means communicating via two physically separated networks.

In FIG. 1A three processing means P1, P2, P3 communicate with each other via two physically separated networks N1, N2, particularly two LANs. As can be seen from the figure there are no bridges between the networks. Messages are sent between the processing means in order to keep the information about the different communication paths up-to-date and to be able to detect errors. Which communication path to be used can be selected using said information. It is also detected when restoration has taken place, i.e. when an error has been repaired etc. Each processing means P1, P2, P3 sends out first messages, particularly special purpose broadcast messages, with a given frequency, which may be the same for all processing means but it may also be different, on all LANs, here N1 and N2, simultaneously informing its peers, i.e. the destination processing means, of its existence. Since it is not possible to send out the special purpose broadcast messages to a processing means completely simulatenously, generally a time window or a predetermined time period has to be defined for each processing means during which the first messages from one and the same sending processing means are to be received if there is no error anywhere. This means that P1 sends a special purpose broadcast message on N1 and N2 substantially simultaneously to P2 and P3. In a similar manner P2 and P3 send out their special purpose broadcast messages to P1, P3 and P1, P2 respectively. When a processing means receives such special purpose broadcast messages simultaneously on all LANs it is connected to, the processing means establishes that all the connections from the sending processing means function and are usable. However, if a processing means detects that all special purpose broadcast messages from a sending processing means do not arrive simultaneously, i.e. within the predetermined time interval or the time window, i.e. the messages are not received on all the LANs simultaneously or within the predetermined time window, the processing means enters a decision process to determine where the error is located and possibly also the kind of the error. An error may for example be a singular error in the communication path or it may be located in the sending device of the sending processing means. The error may also be a device error in the receivers Ethernet device, in case the network is an Ethernet, or a major malfunctioning on that particular LAN, e.g. a switch or hub malfunctioning. Finally, the error may just consist in a glitch in the particular transmission of the misreceived message. The decision as to which kind or location of the error is made by further observing the LAN device of the receiving processing means. If it for example is established that first messages actually are received, then it can be established that the error is not a device error in the receiving processing means and it is also no grand malfunctioning on the particular LAN.

If the duration of the observation period of the receiving device is extended and if, each predetermined time period being called an observation period, for example two (or more) observation periods are considered, the receiving processing means is able to decide if the error is a singular error on the communication path from the sending processing means to the receiving processing means including an error in the sending device of the sending processing means or if it is just a glitch in the particular transmission as referred to above. Thus, if at the next broadcast the receiving processing means receives the special purpose broadcast messages from one and the same receiving device substantially simultaneously, i.e. within the time window, on all networks, the error is just a glitch in the particular transmission of the broadcast message and the error can be disregarded.

If on the other hand the same error remains for a further observation period, the error is a singular error on the communication path from the sender to the receiver or a fault in the sending processing means. According to a first embodiment the receiving processing means then sends a second message to the sending processing means. Such a second message advantageously comprises a unicast special purpose message indicating a communication path error towards the receiving processing means. The second message or unicast message is sent on all LANS. If on the other hand the error is a device error in the receiving processing means or a grand malfunctioning on the particular LAN, i.e. no messages at all are received in the receiving processing means, the receiving processing means includes information thereto in its own next first message, e.g. its own next special purpose broadcast message, which is sent on all networks to all other processing means.

In a preferred embodiment an alarm message is generated and transmitted on all networks in case it is established that the error is a singular error on the communication path from the sending to the receiving processing means or an error in the sending device of the sending processing means as well as if it is a device error in the receiving processing means or a grand malfunctioning on a particular LAN, such as for example a switch or a hub malfunctioning. This is to provide information to the operation and maintenance equipment that there is an error.

Through the reception of the second messages, or the unicast messages, from receiving processing means indicating that there is an error and through using the information in different broadcast frames indicating a device error in the receiving processing means or a grand malfunctioning on a network, a sending processing means can build a table of all each peers, i.e. all other processing means it communicates with, including information about which communication paths that exist towards them. Through the use of the information in such a table, which may be provided either in the processing means or in association therewith or in an intermediate message handling device, containing information about communication paths from the processing means to each of its peers in every processing means, it is possible to circumvent errors in one of the LAN device circuits in a processing means as well as grand malfunctions in one of the LANs, for example when the hub or the switch has malfunctioned. It is thus possible to control which communications paths are to be used for communication with the other processing means. It is also possible to handle the case when one-way errors exist between two communicating peers (i.e. processing means) also if the errors are on separate LANs as all processing means keep their own information about usable communication paths to all other processing means (peers). Similarly it is possible to recover from a failover mode. Information in the table collected via the unicast messages and broadcast messages indicating a major malfunctioning as referred to above are then directly or indirectly deleted from the table since first messages are sent all the time providing an updated view of the situation. This recovery does thus take place automatically. Although through the inventive concept delivery of every messages sent is not guaranteed it can however be guaranteed that an error be detected and circumvented within a maximum time period in peer-to-peer communication. For example, within the time period it takes to send two first messages the error will be detected in case it has been settled that a unicast message will be sent out if during two consecutive observation periods, the same error remains. The network overhead is proportional to the number of processing means and it is limited to one packet per processing means and poll period given that no errors occur.

Figure 1B:
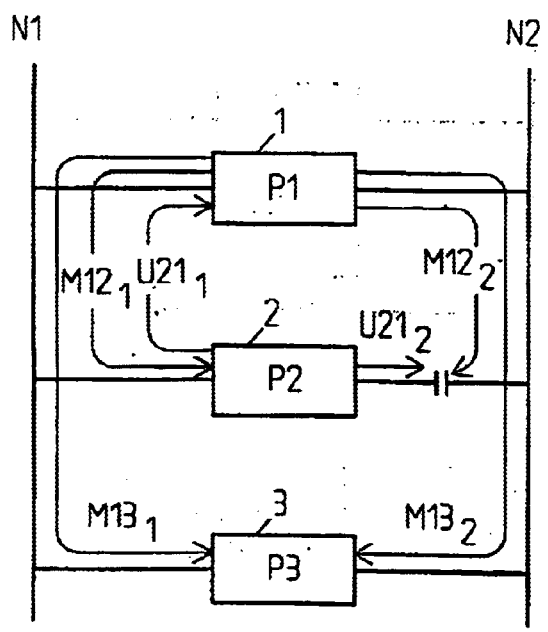
FIG. 1B illustrates the sending of messages between the processing means of FIG. 1A when there is an error on one of the communication paths.

FIG. 1B is a figure similar to that of FIG. 1A illustrating some of the first and second messages sent in case an implementation as described above is used and when there is an error in one of the communication paths. It is here supposed that the first messages in this embodiment are a burst of unicast messages. First processing means P1 1 sends first messages $M12_1$, $M12_2$ on LAN $N_1$ and $N_2$ respectively to processing means P2 2 Processing means P1 1 also sends first messages $M13_1$ and $M13_2$ to processing means P3 3 using LAN $N_1$ and $N_2$ respectively. Of course also processing means P2 2 and P3 3 in a similar way and at the same time sends first messages on both $N_1$ and $N_2$ to P1, P3 and P1, P2 respectively. This is however not illustrated in the figure for reasons of clarity. In the illustrated embodiment, however, processing means P2 2 detects that there is an asymmetry in the reception of messages from P1 1 since only $M12_1$ is received within the time window. Processing means P2 2 is supposed to, in this case, wait for the next transmission of first messages from P1 1. However, the error remains and the asymmetry in the reception of messages from P1 1 is the same, i e. there is no message received from P1 over LAN N2. P2 then generates a second messages, e.g. a unicast message intended for P1 only to inform P1 that there is an error on P2 The unicast messages are also sent on all networks, N1 and N2 and thus once unicast message $U21_1$ is sent on N1 to P1. A unicast message $U21_2$ is likewise sent to P1 on N2. P1 is then informed about the error in the communication path on N2 to processing means P2 and therefore uses the communication path on N1 to processing means P2. The second (unicast) messages are sent on all networks since for example the case might be that there is an error on the communication path from P1 to P2 on N2 whereas the communication path functions in the other direction from P2 to P1. If the unicast message was only sent on N1, P1 would not receive information contained in the unicast message in case there was a one-way error for tranmissions from P2 to P1 on N1.

Figures 1C, 2A:
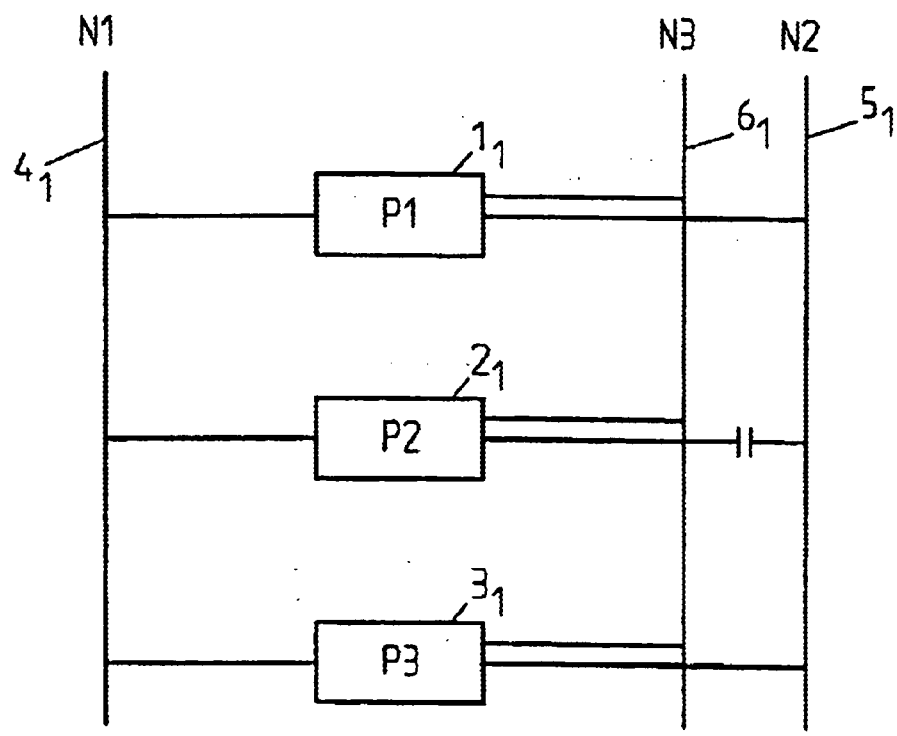
FIG. 1C illustrates a table that is built in one of the processing means of FIG. 1A.
FIG. 2A shows an alternative embodiment in which a number of processing means communicate via three networks.

The table in information holding means of P1 is then built using the information in the second (unicast) messages. Such a table is illustrated in FIG. 1C. The table includes information about all the processing means, or peers, with which P1 communicates, in this case P2 and P3 (generally these are of course more than three communicating processing means). It also indicates which are the usable communication paths. Thus, in this case, for P2 is indicated that the communication path to P1 via N1 is usable and for P3 is indicated that the communication paths via N1 and N2 are usable. Of course, the table could instead indicate which communication paths do not function. Still further, if an error such as a grand malfunctioning on a particular LAN or a device error in the receiving processing means, as informed about via a broadcast message (or burst of unicast messages) as discussed above, would also be included in the table. However, in this particular case there is no such error. Although in FIG. 1D the first messages are referred to as bursts of unicast messages, the functioning would be substantially the same for broadcast messages as referred to with reference to FIG. 1A.

Figure 2B:
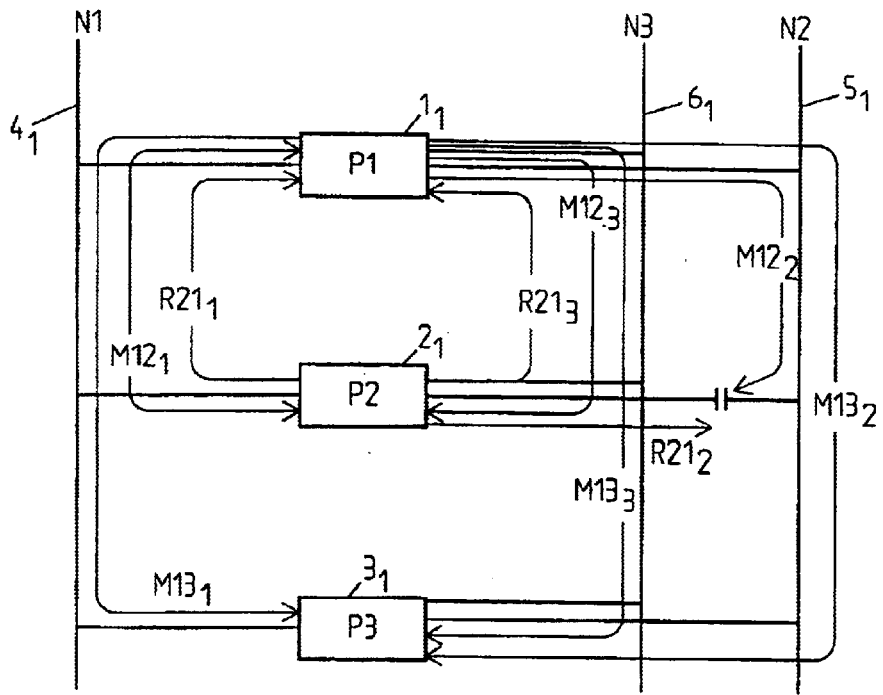
FIG. 2B is a figure similar to that of FIG. 2A illustrating some of the messages sent when there is an error on one of the communication paths.

FIG. 2A shows an embodiment in which three processing means P1 $1_1$, P2 $2_1$, P3 $3_1$ are connected to each other via three physically separated networks (LANs) N1 $4_1$, N2 $5_1$, N3 $6_1$. The implementation as described above is of course also applicable to three or more separately arranged networks. However, in this case an alternative embodiment will be illustrated with reference to FIGS. 2A, 2B in which three processing means are connected to three networks. However, this embodiment is also not limited to three networks but there can be two or more than three as well. In this embodiment, similar to the embodiments as described above, all processing means P1 $1_1$, P2 $2^1$, P3 $3_1$ send out first messages, particularly special purpose broadcast messages with a given frequency (which may be the same or different for the different processing means) on all networks N1 $4_1$, N2 $5_1$, N3 $6_1$ substantially simultaneously to all other processing means so that all processing means or peers are informed about the existence of all the others. However, this embodiment differs from the preceding embodiment in that all processing means receiving such a first message are to respond by a response message to the sending processing means and through indicating on which networks it received the first message (here the special purpose broadcast message). Such a response message in an advantageous embodiment also is a unicast message, but it is sent to the sender as soon as possible. The response message is sent on all networks N1, N2, N3 (or particularly all LAN segments) simultaneously like the first messages. When an initiating processing means, i.e. a processing means sending out first messages, receives such response messages, it can build a table in its information holding means of all its peers, i.e. all other processing means with which it communicates, including information about which communication paths exist towards these other processing means using the response messages instead of second (unicast) messages indicating an error. Through the building of a table of usable communication paths from itself to each of its peers in every processing means, it is possible to detect and circumvent errors in one of the LAN device circuits in a processing means as well as grand malfunctions in one of the LANS, i.e. when the hub or switch has malfunctioned. It is also possible to handle the case when one-way errors occur for two communicating processing means or peers if the errors are on different LANs since all processing means keep their own picture of usable communication paths to all the other processing means with which they communicate. Similarly, as referred to above, it is also possible to recover from a failover mode since the first messages are sent out continously and then, as soon as an error has been repaired or a communication path has been restored, an initiating processing means is informed thereon when it receives the response message. Like in the first embodiment described above delivery of every message sent is not guaranteed but the time period until detection and circumvention of an error can be guaranteed in the peer to peer communication, i.e. the communication between one processing means and another processing means. Also in this case fault tolerance is provided transparently to the users of the LAN services and it is achieved through the use of an intermediate arrangement between the peers, i.e. the processing means and the composite LAN, i.e. the physically separated networks. The functionality of such an intermediate arrangement can also be provided for in the respective processing means. This embodiment will now be further described in a simplified manner with reference to FIG. 2B. FIG. 2B shows an arrangement similar to that of FIG. 2A in which some of the sent messages are illustrated. The processing means P1 sends a first message, particularly a special purpose broadcast message $M12_2$ to processing P2 via LAN N1 $4_1$. It should be noted that the first messages here being special purpose broadcast messages are denoted differently even if the messages are identical, i.e. the same message is provided to each processing means, according to the principles of broadcasting. This is so merely for explanatory reasons. P1 $1_1$ substantially simultaneously sends a first message $M12_2$ to P2 over LAN N2 $5_1$ and finally a first message $M12_3$ to P2 on LAN N3 $6_1$. In a similar manner first messages $M13_1$, $M13_2$, $M13_3$ are sent on LANs N1, N2, N3 to P3. Of course P2 and P3 send first messages to P1, P3 and P1, P2 respectively. These are however not illustrated for reasons of clarity. In P2, or in an intermediate device included in an intermediate arrangement, which intermediate device is arranged in association with P2, generation and transmission of response messages is handled. As in the first embodiment a time window defining simultaneousness may be defined and when P2 establishes that there is an asymmetry in the reception of first messages from P1, a response message is sent to P1 including information about on which LANs N1, N2, N3 it has received a first message from P1. In this case it is supposed that the transmission path from P1 to P2 via N2 contains an error and thus $M12_2$ from P1 has not been received in P2. P2 then sends a response message $R21_1$ to P1 over N1, a response message $R21_2$ to P1 on N2 and a response message $R21_3$ to P1 on N3. All the response messages contain the same information, namely that the transmission path from P1 to P2 via N2 does not function. The response messages are also sent on all networks in case there is a one-directional error. For example the communication path via N2 may function in the direction from P2 to P1 whereas for example the communication path from P2 to P1 via N1 and/or N3 might not function.

In an alternative embodiment response messages (also in this case unicast messages to P1) are sent containing the information that the particular transmission path used functioned. However, tables are then built in the respective processing means using the information in the response messages. It is supposed that all processing means know about the existence of all other processing means. For example this information may be provided externally or it is based on the fact that a processing means once has existed.

In this case, in the information holding means of P1 is thus information contained that communicating peers are P2 and P3. In this case, for example, is indicated in the table that for P2 N1 and N3 can be used and in that for P3 N1, N2 and N3 can be used. In a similar way a table is provided in P2 indicating that for P1 N1 and N3 are usable whereas for P3 N1 and N3 are usable. Finally, the table of P3 shows that for P1 N1 and N2 and N3 are usable whereas for P2 N1 and N3 are usable (if the error is bidirectional. Alternatively the tables contain information about which paths do not function.

Advantageously the networks are networks supporting a broadcasting functionality which permits broadcasting first messages. Alternatively a separate arrangement would have to be provided to inform all the processing means of the existence about all the other processing means.

Figure 3:
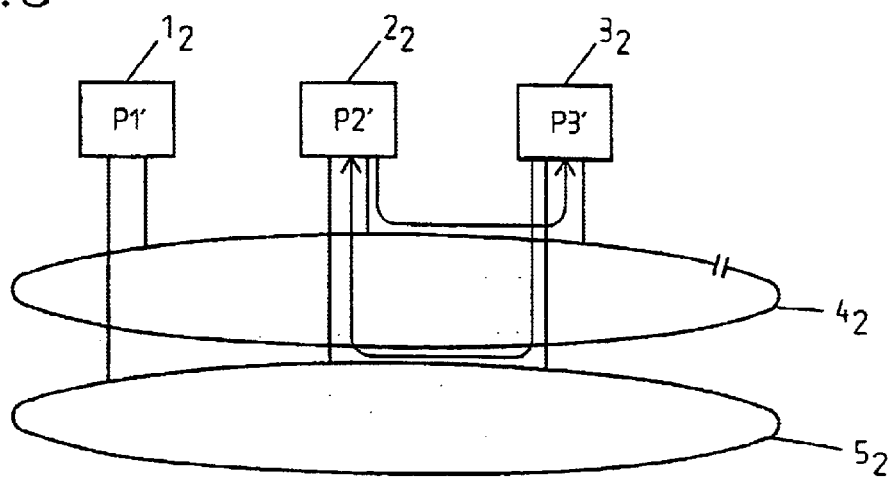
FIG. 3 is an alternative illustration of a number of processing means communicating via two networks.

FIG. 3 is a simplified illustration of three processing means P1', P2' and P3' communicating via two physically separated networks $4_2'$, $5_2$. The networks may be of different kinds, for example it may be local area networks, Ethernet, FDDI, ATM etc. Thus different networks can be mixed in any manner, the main thing being that there are more than one transmission media which are physically separated from each other. Thus, some of the networks may support a broadcasting functionality whereas others do not. If there is such a combination of networks, there are different possibilites for the sending of (first) messages. In one implementation each network sends messages depending on what it supports. This e.g. means that an Ethernet sends broadcast messages whereas an ATM network sends unicast messages. In another implementation all networks, i.e. also networks supporting broadcasting, send unicast messages, for reasons of uniformity. In still another implementation, a broadcast simulator is introduced in the network(s) not supporting broadcasting.

In FIG. 3 it is supposed that there is a rupture in $4_2$. The figure also illustrates that messages can be sent using different networks for transmission in different directions.

In an alternative embodiment the information provided to the information holding means of the different processing means can be used to implement load sharing in any appropriate way, for example one communication path can be used for traffic in one direction whereas another communication path can be used for communication in the other direction taking the load situation into account.

Figure 4:
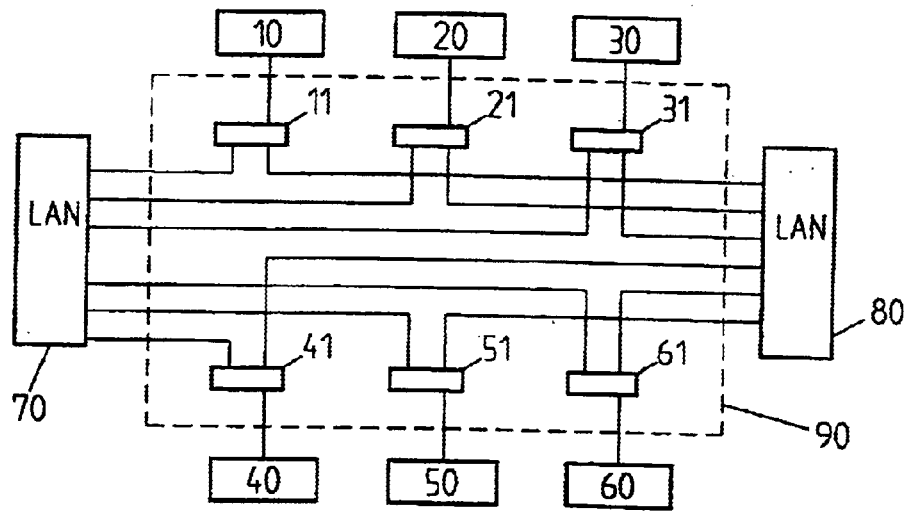
FIG. 4 shows a first embodiment with a number of processing means wherein an intermediate arrangement is provided for the provision of network redundancy.

FIG. 4 shows a number of processing means 10, 20, 30, 40, 50, 60 communicating with each other via two LANs 70, 80, e.g. comprising a switch or a hub. To each processing means 10, 20, 30, 40, 50, 60 an intermediate device 11, 21, 31, 41, 51, 61 respectively is provided. The intermediate devices form an intermediate arrangement 90 for provision of LAN redundancy. The handling of received and transmitted messages may be taken care of via software provided in the respective processing means and there is just one communication path to each processing means from its respective intermediate device. The redundancy logic is provided in the hardware of the intermediate devices 11, 21, 31, 41, 51, 61. Via the intermediate devices each processing means communicate with all the other processing means via their respective intermediate devices on LANs 70 and 80 respectively. The information holding means, in which an information table is built, can be provided for either in the processing means or in the intermediate devices. LAN redundancy is provided to the users of the LAN services through the intermediate arrangement 90 which is arranged between the peers, i.e. the respective processing means and the composite LANs. As referred to earlier in the application the tables can be built using the second messages, i.e. the unicast messages (and broadcast messages sent out in case a major error is detected). Alternatively the tables may be built using response messages. Advantageously each processing means or each sending processing means (all processing means form sending processing means as well as receiving processing means) keep information about how all the other processing means, i.e. receiving processing means, can be reached.

Figure 5:
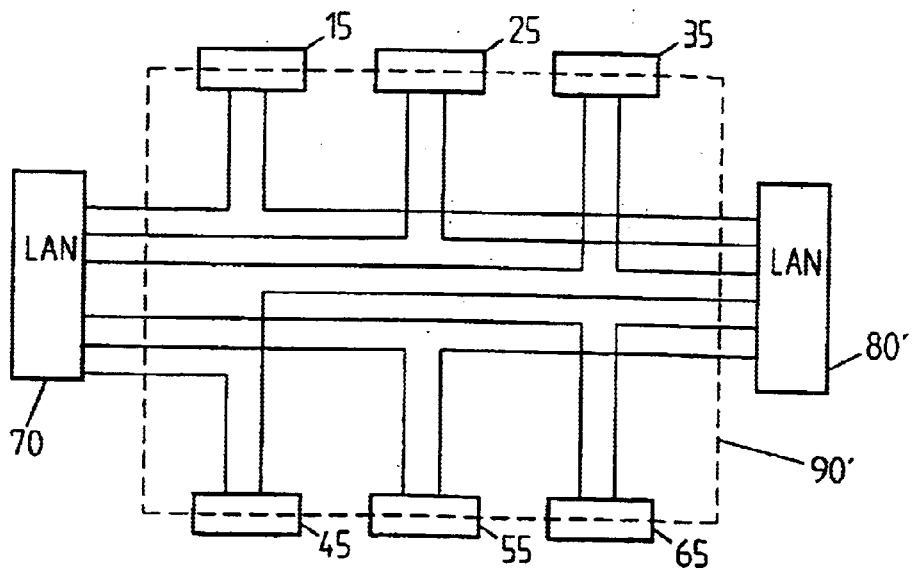
FIG. 5 shows an alternative embodiment for providing network redundancy.

FIG. 5 is a figure similar to that of FIG. 4 but showing an alternative embodiment. Also in this case a number of processing means 15, 25, 35, 45, 55, 65 communicate with each other via two LANs 70', 80' for example forming a swith or a hub. However, in this case the functionalities of the respective intermediate devices are comprised in the respective processing means. Thus there are LAN communication paths in to each processing means, one from each of LAN 70', 80'. The intermediate arrangement 90' can in this care be said to be fictive and is illustrated through the dashed line 90'. In other aspects the functioning is the same as that of the embodiment as discussed with reference to FIG. 4 but the redundancy providing functionality is included in a piece of software in the respective processing means. Also in this case the tables ore built up either using unicast messages, as discussed above, or using response messages. Of course is also any combination of the implementations as described with reference to FIGS. 4 and 5 possible meaning that for some processing means separate intermediate devices may be provided whereas for others the functionalities are included in the processing means.

Figure 6:
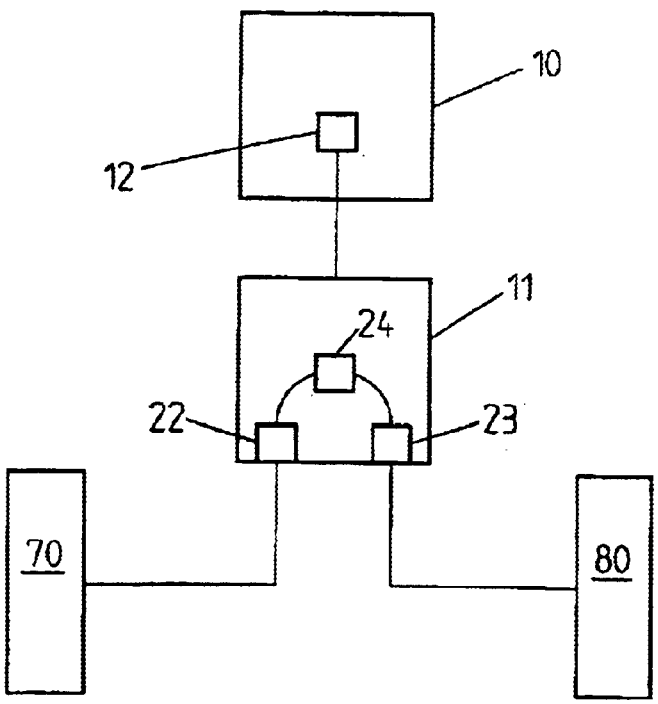
FIG. 6 shows a processing means of the embodiment of FIG. 4 to which a separate message handling means is connected.

In FIG. 6 the processing means 10 of FIG. 4 is illustrated. As can be seen the processing means 10 is connected to the intermediate device 11 and the communication paths to the switches or LANs 70, 80 are schematically indicated. In this embodiment it is supposed that the information holding means 12 are comprised in the processing means 10. However, said information holding means could also be provided in the intermediate device 11 or separately. Input/output means 22, 23 are provided for the communication paths on LANs 70, 80 respectively. In the intermediate device 11 logical means 24 handling LAN redundancy is provided in the form of hardware. As can be seen from FIG. 6 there is just one connection to the processing means 10 itself.

Figure 7:
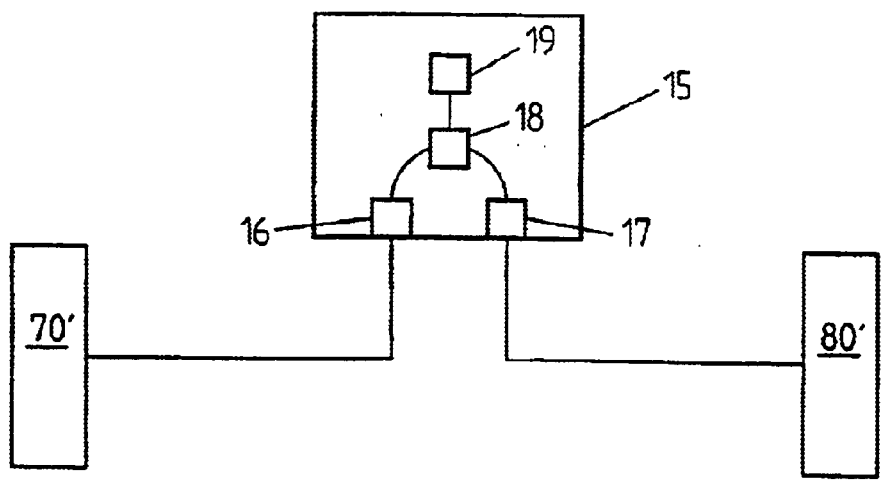
FIG. 7 shows a processing means according to the embodiment of FIG. 5 in which the processing means and the message handling means are provided in a common entity.

In FIG. 7 for example processing means 15 of FIG. 5 is illustrated. As dicussed with reference to FIG. 5 both the message handling functionality and the processing functionality are provided in a common unit, the processing means 15, and there are two LAN Communication paths from LAN 70' and LAN 80' respectively to the processing means 15. Physical access means 16, 17 are provided for access to the LAN:s and the particular handling of the redundancy is provided for by means 18, e.g. in the form of software, communicating with the information holding means 19. Of course the processing means 15 also include the processing functionality although not illustrated. Also in this case the information holding means could be provided separately.

Figure 8:
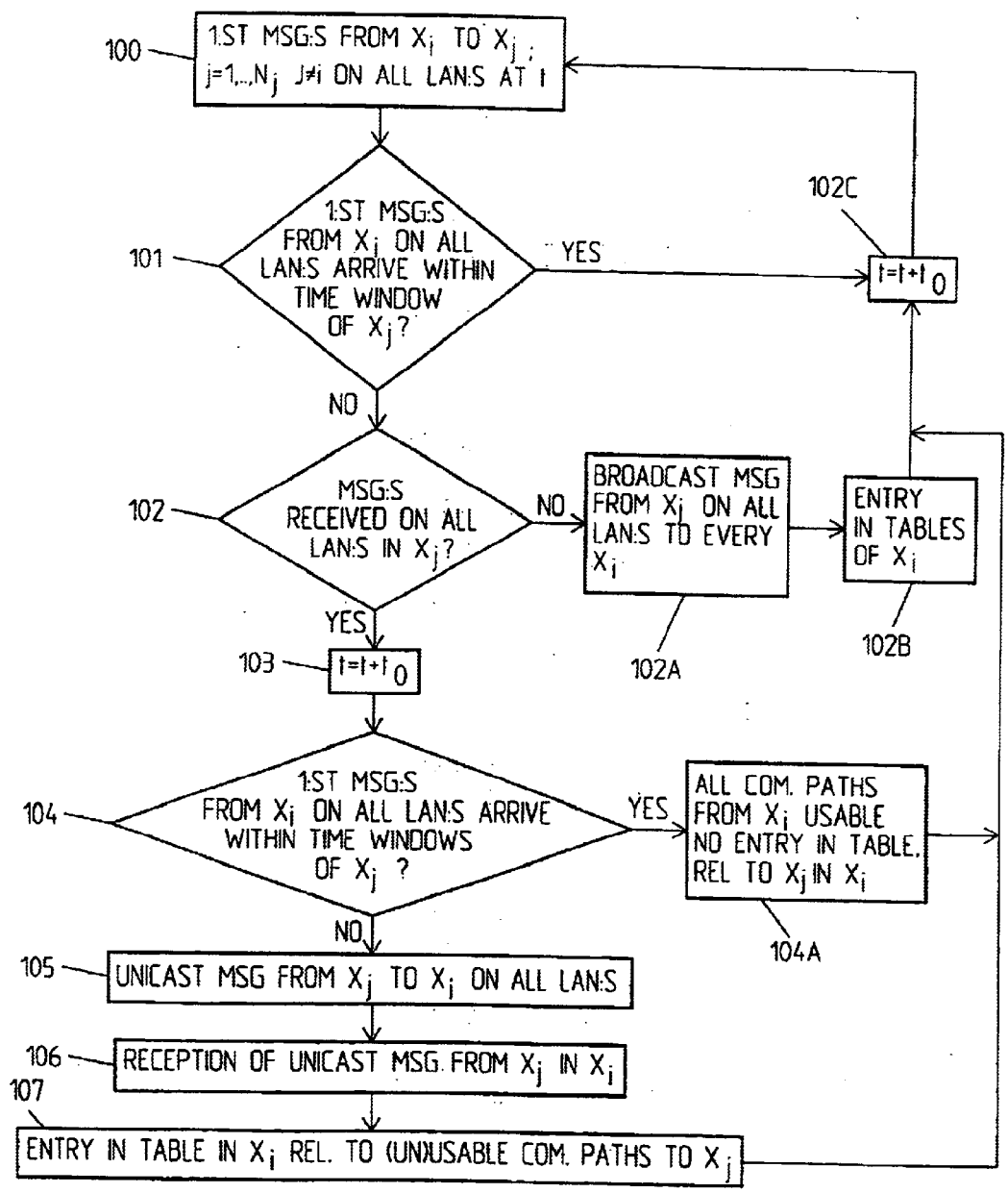
FIG. 8 is a flow diagram illustrating the provision of fault tolerant communication according to a first embodiment.

An example on the functioning according to the first embodiment in which second messages, e.g. unicast messages are used to build up the information table in a processing means (or in association with a processing means) will be illustrated with reference to the flow diagram of FIG. 8. It is here supposed that first messages, preferably special purpose broadcast messages, are sent from processing means $X_i$ at time t to all other processing means $X_j$ wherein j=1, . . . ,N; N being the number of processing means (excluding the sending processing means itself) on all networks, particularly on all LANs, 100. In the receiving processing means $X_j$ is then detected whether the first message on all LANs from sending processing means $X_i$ are received within the predetermined time window, 101. If they do, 102, no action is taken and the same procedure, which actually takes place substantially simultaneously, is undergone in processing means $X_{j+1}$ etc. The next first messages from $X_i$ to $X_j$ are then sent at $t=t+t_o$, 102C. It should also be clear that the same procedure is repeated in $X_j$ for the respective first messages from other processing means $X_i$ which also may occur substantially simultaneously. This is however not explicitly indicated in the figure. If it is detected that there is an asymmetry in the reception of messages from $X_i$, i.e. that not all first messages from $X_i$ on all LANs arrive within the time window, is examined whether messages arrive at all in $X_j$ on all LANs, 102. If for one or more LANS, there actually do not arrive any messages at all, $X_j$ includes information to that fact in its next broadcast message, i.e. in its own first message, which is sent on all LANs to all other processing means, $X_i$, i=1, . . ,N, 102A. An entry is done in each table of all the other processing means $X_i$, 102B which indicate either that the particular LAN does not function or that there is a malfunction in $X_j$, 102B. If on the other hand it is established that messages actually do arrive in $X_j$ on all LANs, it is examined whether the subsequent first messages, at $t=t+t_o$, 103, from $X_i$ on all LANs arrive within the time window of $X_j$, 104. If yes, it is established that all communication paths from $X_i$ are usable since the error actually just was a glitch in the particular transmission of a particular message and no entry is done in the table of $X_i$ relating to $X_j$. As referred to above the same procedure takes place substantially simultaneously in $X_{j+1}$, ..., for first messages from $X_i$.

If however the anomaly with respect to reception of messages from $X_i$ on all LANs remain, $X_j$ generates a unicast message which is sent to $X_i$ on all LANs, 105. The unicast message(s) from $X_j$ is/are then received in $X_i$, 106 and an entry is done in the table of $X_i$ relating to an unsuable communication path to $X_j$, 107. As referred to above the same procedure is gone through in every processing means $X_j$ receiving messages from $X_i$ (as well as in $X_i$ relating to first messages received form all the other processing means $X_j$).

Thus a table is built in all processing means using the received unicast messages and broadcast messages containing information about major malfunctioning in a receiving means or in a LAN. As will be understood the tables are dynamically built and changes dynamically with the reception of unicast messages and information that may be contained in broadcast messages.

Figure 9:
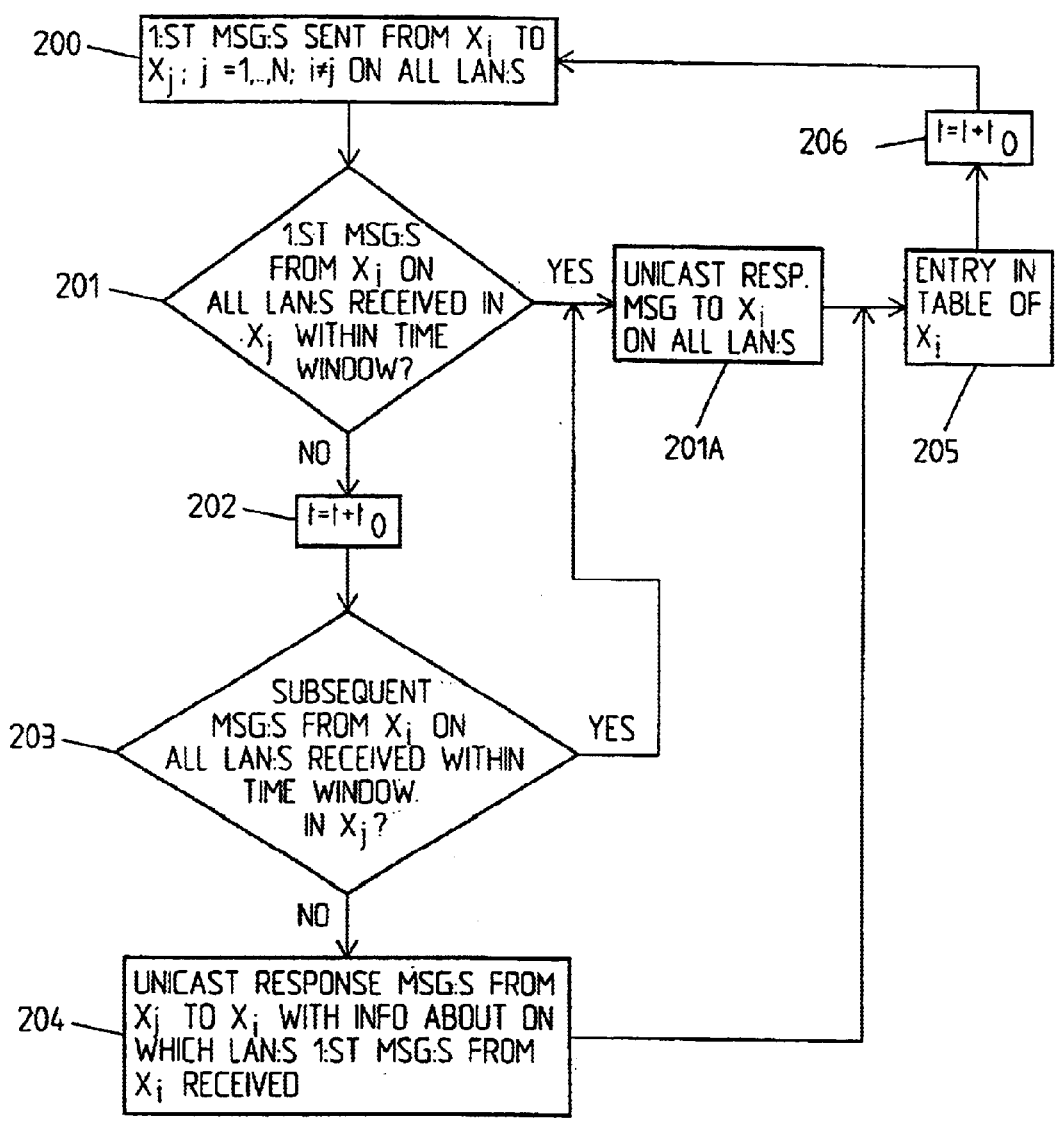
FIG. 9 is a flow diagram illustrating the provision of fault tolerant communication according to a second embodiment using response messages.

FIG. 9 is a flow diagram describing an alternative embodiment according to which the tables in the respective processing means are built using response messages. Like in the embodiment as discussed with reference to FIG. 8 a first message, particularly a special purpose broadcast message is sent from $X_i$ to processing means $X_j$ on all LANs substantially simultaneously, 200. It is then examined in $X_j$ whether the first messages from $X_i$ on all LANs arrive within the predetermined time window of $X_j$, 201. If yes, a unicast response message is sent to $X_i$ on all LANs, 201A and an entry is done in the table of $X_j$, 205, relating to usable communication paths from $X_i$ to $X_j$. Then the table entries as far as $X_j$ is concerned remain unchanged until, possibly, after the next dispatch of first messages from $X_i$ to $X_j$ which takes place at time t+$t_o$, $t_o$ being the sending frequency of first messages, 206, and the procedure is repeated.

If, however, it is established that the first messages from $X_i$ on all LANs do not arrive within the time window of $X_j$, the next dispatch of first messages from $X_i$ to $X_j$ is awaited, which, as referred to above, takes place with the frequency $t_o$, 202. Then is examined whether the subsequent first message from $X_i$ on all LANs arrive within the time window of $X_j$, 203. If yes, a unicast response message is sent to $X_i$ on all LANs containing information that the first message was received on all LANs, 201A, and an entry is done in the table of $X_j$, 205. This is done in order to be able to ignore simple errors like a glitch in the particular transmission of a message. If however the error remains, a unicast response message is sent from $X_j$ to $X_j$ containing information about on which LANs first message from $X_i$ was/were received, 204. An entry containing that information is then done in the table in $X_j$ relating to $X_j$, 205, and again the table information as far as $X_j$ is concerned remains unchanged until the next dispatch of first message from $X_i$ to $X_j$ which occurs a time period to later.

Figure 10:
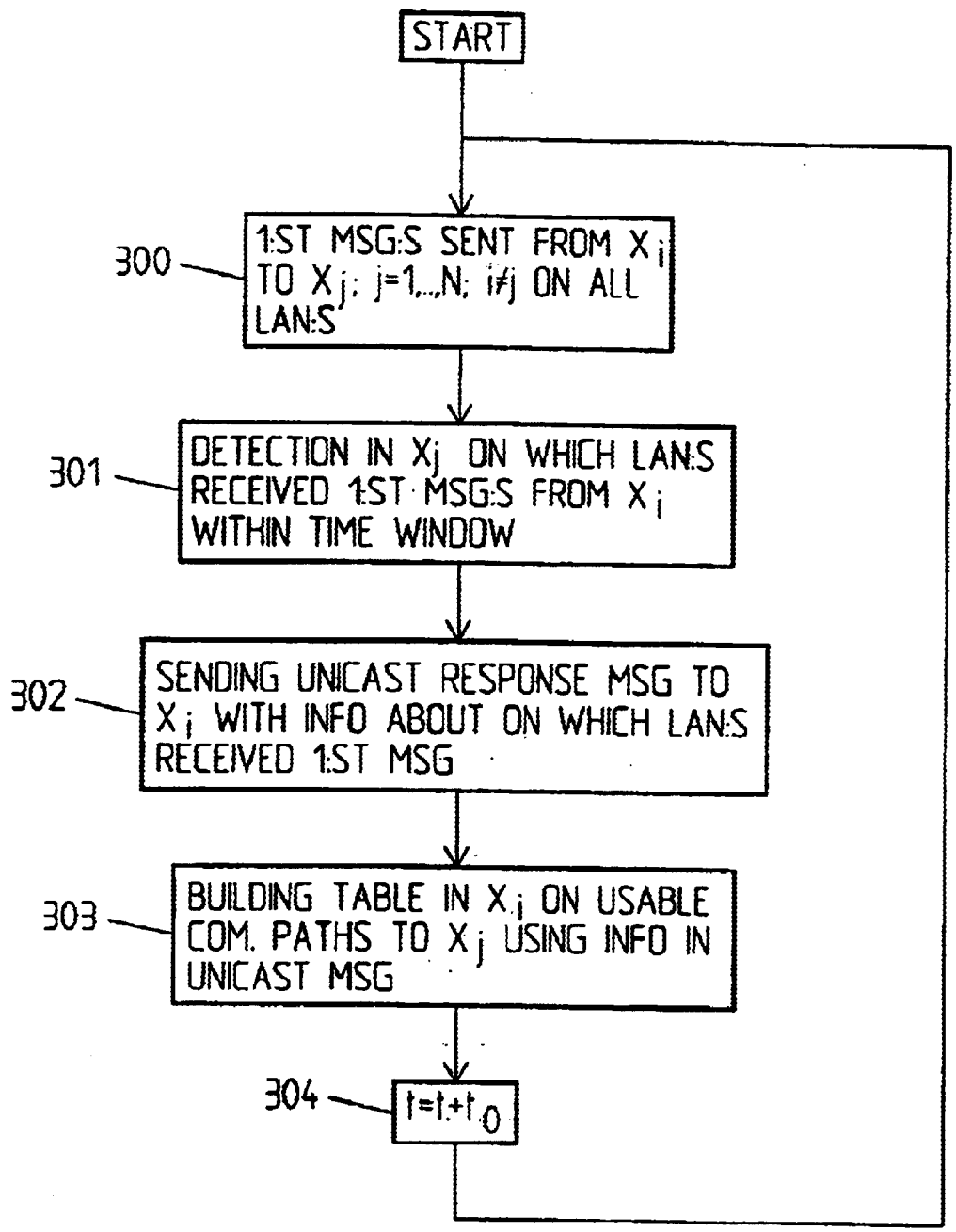
FIG. 10 is a flow diagram illustrating an alternative embodiment using response messages.

In an alternative embodiment as illustrated with reference to FIG. 10 according to which a table also is built using response messages, first messages are sent from $X_i$ to $X_j$ on all LANs, 300. In $X_j$ is then detected on which LANs first messages from $X_i$ are received within the time window, 301. $X_j$ then sends a unicast response message as soon as possible to $X_i$ containing information about or which LANs it received a first message, 302. A table is then built in $X_i$ using said information and indicating which communication paths, i.e. which LANs can be used for communication from $X_i$ to $X_j$, 303. The table content as far as $X_j$ is concerned remains the same until the next dispatch of a first message from $X_i$ to $X_j$ on all LANs which occurs a time interval $t_o$ later, 304, $t_o$ being the frequency at which first messages are sent out from $X_i$. The table in $X_i$ is built using the corresponding information received from all other processing means to which it sends out firsts broadcast messages and the corresponding procedure takes place for all the other processing means as well.

As referred to earlier in the application first messages can be sent out separately but they can also be piggy-backed on other messages, e.g. ordinary traffic messages. Still further a combination of separate messages and piggy-backed messages is possible, e.g. to maintain a given frequency for sending out of first messages or depending on need. Information may also gathered taking advantage of information obtained through the ordinary user traffic.

The invention is of course not limited to the particularly illustrated embodiments but it can be varied in a number of ways within the scope of the appended claims.

What is claimed is:

1. Distributing arrangement for distribution of messages in a communication system supporting communication of packet data, said distributing arrangement comprising a number of processing means communicating with each other, wherein each processing means is connected to all the other processing means via at least two communication networks/network segments being physically separated from each other without any bridges or connections therebetween, for each processing means, information holding means are provided for keeping information about all communication paths to all other processing means, and for obtaining information, first messages are sent from each processing means to all the other processing means using all of said at least two communication networks.

2. An arrangement according to claim 1, wherein the first messages are sent with a given frequency, a predetermined time interval is defined for each processing means, and messages received in a processing means from another processing means using different communication paths within the predetermined time interval indicate that said communication paths are usable at least for communication in one direction.

3. An arrangement according to claim 1, wherein at least some first messages are piggy-backed on traffic messages or similar messages.

4. An arrangement according to claim 1, wherein the first messages are special purpose broadcast messages.

5. An arrangement according to claim 1, wherein the first messages comprise a burst of unicast messages.

6. An arrangement according to claim 1, wherein each processing means sends all first messages to other processing means on all network/network segments substantially simultaneously.

7. An arrangement according to claim 1, wherein each processing means comprises means for detecting anomalies in the reception of messages from one and the same sending processing means, and when such an anomaly, which is indicative of an error, is detected, the receiving processing means enters a decision process to establish the localization and/or the kind of the error.

8. An arrangement according to claim 7, wherein said means for detecting anomalies comprises means detecting whether messages arrive, within a given time interval, or time window.

9. An arrangement according to claim 7, wherein the messages are numbered in sequence or any appropriate manner, and said means for detecting anomalies are used to detect if one or more messages is/are missing.

10. An arrangement according to claim 8, wherein if all first messages, on different networks, sent from one and the same processing means are not received within the given time interval, or time window, for one or a given number of consecutive observation periods in a receiving processing means or one or more messages are missing, said receiving processing means sends a second message to the sending processing means on all available networks substantially simultaneously.

11. An arrangement according to claim 1, wherein if no messages are received in a processing means on one of the networks, information thereon is included in the subsequent first messages from said processing means, which messages are broadcast to all other processing means using all available of said at least two networks to inform said other processing means that no messages are received on that particular network.

12. An arrangement according to claim 1, wherein each processing means comprises means for generation of an alarm message, and if an anomaly remains, an alarm is sent to an operation system managing the distributing arrangement using all available of said at least two networks.

13. An arrangement according to claim 1, wherein in each processing means, a table is dynamically built using the information of at least received second messages, information in the respective tables being used to control the sending of messages from the respective processing means.

14. An arrangement according to claim 13, wherein such a table contains information about all usable or unusable communication paths to all peers with which a processing means communicates.

15. An arrangement according to claim 1, wherein each processing means comprises means for generation and transmission of response messages containing information about received first messages, which are sent at least to the respective sending processing means on all networks substantially simultaneously.

16. An arrangement according to claim 15, wherein said information about received first messages is provided in response messages comprising of unicast special purpose messages which are sent to the respective sending processing means including information about on which network(s) a first message is received.

17. An arrangement according to claim 16, wherein said response messages are used to dynamically build tables in information holding means of the receiving processing means, the information of which is used to control the sending of messages from said processing means.

18. An arrangement according to claim 17, wherein each table shows all usable/unusable communication paths to all peers, with which the respective processing means communicate.

19. An arrangement according to claim 11, wherein to at least a number of processing means an intermediate device is connected for handling the sending of at least said first and second messages or first messages and response messages.

20. An arrangement according to claim 1, wherein an intermediate arrangement is provided containing at least a number of intermediate devices.

21. An arrangement according to claim 1, wherein means are provided in at least a number of processing means for handling the generation/sending/receiving of first and second messages or first messages and response messages.

22. An arrangement according to claim 13, wherein the information provided in the information holding means is used for controlling the sending of messages so as to appropriately share the load between the communication paths.

23. An arrangement according to claim 1, wherein the at least two networks are different networks.

24. A communication system supporting communication of packet data including a number of distributing nodes for distribution of messages, each node comprising a number of processing means communicating with each other, wherein all processing means communicate via at least two networks, said networks being physically separated from each other and having no bridges or connections therebetween, each processing means comprises means for sending first messages to all other processing means, said first messages being sent on each of said at least two networks, and for each processing means, information holding means are provided in which information obtainable through the sending of said first messages is collected to provide information about the communication paths at least to all other processing means.

25. A system according to claim 24, wherein said first information messages comprise special purpose broadcast messages, for each processing means a time interval is defined during which first messages from one and the same processing means should arrive, and if all first messages on all networks from the same processing means are not received within the time interval for a number of observation periods, each comprising one time interval, and if the first message that is not received is sent on the same network(s) each time, the receiving processing means generates a second message which is sent to the sending processing means on all available networks.

26. A system according to claim 24, wherein said first information messages comprise a burst of unicast messages, for each processing means, a time interval is defined during which first messages from one and the same processing means should arrive, and if all first messages on all networks from the same processing means are not received within the time interval for a number of observation periods, each comprising one time interval and if the first message that is not received is sent on the same network(s) each time, the receiving processing means generates a second message which is sent to the sending processing means an all available networks.

27. A system according to claim 24, wherein messages are numbered and said numbering is used to establish whether messages arrive in order on all networks or not.

28. A system according to claim 25, wherein if a processing means does not receive any messages of any kind on a particular network, information thereon is provided in its own next first message which is provided to all other processing means using all networks.

29. A system according to claim 24, wherein each processing means receiving first messages comprises means for responding to each sending processing means using a unicast response message keeping information about on which network(s) it received first message(s) from the respective sending processing means.

30. A system according to claim 24, wherein for each processing means, information holding means are provided in which a table is built using the information at least in received second messages to dynamically provide updated information about available communication paths at least to all other processing means.

31. A system according to claim 24, wherein intermediate message handling means are provided which are responsible for the sending/receiving of first messages and second messages or first messages and response messages, said message handling means being provided in connection to at least a number of processing means, a number of, or the totality of intermediate devices forming an intermediate arrangement comprising a number of intermediate devices connected to a number of processing means, respectively.

32. A system according to claim 24, wherein the message handling means responsible for handling, sending, receiving, and generation of first messages and second messages or first messages and response messages are comprised in at least a number of the respective processing means.

33. A method of providing fault tolerant communication in a communication system supporting communication of packet data and comprising a number of distributing nodes, each of which comprises a number of processing means communicating with each other, the method comprising the steps of:

interconnecting each processing means with all other processing means via at least two physically separated networks, sending first messages from each processing means to all the other processing means with a given frequency using all available of said at least two networks, using said information to detect errors on the communication paths, sending processing means and receiving processing means, providing information to at least the sending processing means about the first messages sent from the respective sending processing means to the respective receiving processing means on the at least two networks substantially simultaneously, collecting said information for each of said processing means in information holding means in the other processing means, respectively, and using the information to control the communication between the processing means.

34. A method according to claim 33, wherein the first information messages comprise special purpose broadcast messages or a burst of unicast messages, and the method further comprises the step of:

when detecting that a first message is not received on all networks from a sending processing means, sending a second message comprising a special purpose unicast message to the sending processing means using all of said at least two networks.

35. A method according to claim 34, further comprising the steps of:

defining a time window for each processing means and if first messages from one and the sending processing means do not arrive in a receiving processing means within one and the same time window for a given number of consecutive observation periods, each corresponding to one time interval, using different networks, and building in each processing means a table using at least said second messages.

36. A method according to claim 34, further comprising the steps of:

if a fault is detected on one or more of the communication paths of one or more networks from a particular sending processing means to a receiving processing means, sending a unicast message to the sending processing means, and if it is detected that there is a malfunctioning in the receiving processing means or an error an one or more of the networks including information about that in the next first special purpose broadcast message of the receiving processing means, and broadcasting said first message using all networks.

37. A method according to claim 33, further comprising the steps of:

confirming in unicast response messages the first messages from the receiving processing means to the sending processing means using each network so as to provide information about usable/unusable communication paths on every network from the sending to the receiving processing means, and building a table with information about available communication paths using said response messages in each processing means.

* * * * *

UNITED STATES PATENT AND TRADEMARK OFFICE
CERTIFICATE OF CORRECTION

PATENT NO. : 6,728,204 B1 Page 1 of 2
APPLICATION NO. : 09/324895
DATED : April 27, 2004
INVENTOR(S) : Helander et al.

It is certified that error appears in the above-identified patent and that said Letters Patent is hereby corrected as shown below:

In Column 1, Line 49, delete "reducancy" and insert -- redundancy --, therefor.

In Column 3, Line 8, delete "intervals" and insert -- interval --, therefor.

In Column 3, Line 30, delete "parallell" and insert -- parallel --, therefor.

In Column 4, Line 55, delete "proccessing" and insert -- processing --, therefor.

In Column 7, Line 37, delete "intention" and insert -- invention --, therefor.

In Column 7, Line 39, delete "LANS" and insert -- LANs --, therefor.

In Column 7, Line 57, delete "mesages" and insert -- messages --, therefor.

In Column 7, Line 62, delete "partcularly" and insert -- particularly --, therefor.

In Column 7, Line 66, delete "maintaning" and insert -- maintaining --, therefor.

In Column 8, Line 23, delete "simulatenously" and insert -- simultaneously --, therefor.

In Column 9, Line 15, delete "LANS" and insert -- LANs --, therefor.

In Column 10, Line 28, delete "i e." and insert -- i.e. --, therefor.

In Column 10, Line 31, after "P2" insert -- . --.

In Column 10, Line 44, delete "tranmissions" and insert -- transmissions --, therefor.

In Column 10, Line 62, delete "FIG. 1D" and insert -- FIG. 1B --, therefor.

In Column 11, Line 10, delete "P2 $2^1$" and insert -- P2 $2_1$ --, therefor.

In Column 11, Line 38, delete "LANS" and insert -- LANs --, therefor.

In Column 11, Line 46, delete "continously" and insert -- continuously --, therefor.

In Column 12, Line 59, delete "$4_2$" and insert -- $4_2$ --, therefor.

In Column 12, Lines 66-67, delete "possibilites" and insert -- possibilities --, therefor.

UNITED STATES PATENT AND TRADEMARK OFFICE
CERTIFICATE OF CORRECTION

PATENT NO. : 6,728,204 B1
APPLICATION NO. : 09/324895
DATED : April 27, 2004
INVENTOR(S) : Helander et al.

It is certified that error appears in the above-identified patent and that said Letters Patent is hereby corrected as shown below:

In Column 13, Line 54, delete "swith" and insert -- switch --, therefor.

In Column 13, Line 59, delete "care" and insert -- case --, therefor.

In Column 13, Line 64, delete "ore" and insert -- are --, therefor.

In Column 14, Line 19, delete "dicussed" and insert -- discussed --, therefor.

In Column 14, Line 22, delete "Communication" and insert -- communication --, therefor.

In Column 14, Line 25, delete "LAN:s" and insert -- LANs --, therefor.

In Column 14, Line 57, delete "LANS" and insert -- LANs --, therefor.

In Column 15, Line 11, delete "unsuable" and insert -- unusable --, therefor.

In Column 15, Line 59, delete "to" and insert -- $t_0$ --, therefor.

In Column 16, Line 9, delete "firsts" and insert -- first --, therefor.

In Column 17, Line 57, in Claim 19, delete "claim 11" and insert -- claim 1 --, therefor.

Signed and Sealed this

Seventeenth Day of June, 2008

JON W. DUDAS
*Director of the United States Patent and Trademark Office*